(12) United States Patent
Langston

(10) Patent No.: US 7,562,836 B2
(45) Date of Patent: *Jul. 21, 2009

(54) APPARATUS, SYSTEM, AND METHOD FOR CONDENSING, SEPARATING AND STORING RECYCLABLE MATERIAL

(76) Inventor: Jody Langston, 8711 State Route 702, Roy, WA (US) 98580

( * ) Notice: Subject to any disclaimer, the term of this patent is extended or adjusted under 35 U.S.C. 154(b) by 576 days.

This patent is subject to a terminal disclaimer.

(21) Appl. No.: 11/119,627

(22) Filed: May 2, 2005

(65) Prior Publication Data

US 2006/0042197 A1 Mar. 2, 2006

Related U.S. Application Data

(60) Provisional application No. 60/567,600, filed on May 3, 2004, provisional application No. 60/611,661, filed on Sep. 21, 2004.

(51) Int. Cl.
*B02C 19/00* (2006.01)

(52) U.S. Cl. .......................... 241/23; 241/37.5; 241/65; 241/100; 241/25; 241/101.1; 241/101.2; 100/315; 264/37.1; 209/630; 209/930

(58) Field of Classification Search .............. 241/101.2, 241/101.3, 65, 23, 37.5, 101.1, 25, 100; 100/315, 316, 317, 337, 339; 264/37.1; 209/630, 702, 930

See application file for complete search history.

(56) References Cited

U.S. PATENT DOCUMENTS

| | | | | |
|---|---|---|---|---|
| 4,102,263 A | 7/1978 | Forsberg | ...................... | 100/74 |
| 4,537,361 A | 8/1985 | Heimerich | ................... | 241/81 |
| 4,620,479 A | 11/1986 | Diamond et al. | ............ | 100/215 |
| 4,996,918 A | 3/1991 | Carter et al. | .................. | 100/52 |
| 5,119,722 A | 6/1992 | Carter et al. | ................. | 100/221 |
| 5,123,341 A | 6/1992 | Carter et al. | ................. | 100/223 |
| 5,129,318 A | 7/1992 | Zimmer | ....................... | 100/53 |
| 5,172,630 A | 12/1992 | Thompson | .................. | 100/193 |
| 5,221,052 A | 6/1993 | Vega | ........................... | 241/36 |
| 5,251,832 A * | 10/1993 | Hentschel | .............. | 241/101.76 |

(Continued)

FOREIGN PATENT DOCUMENTS

DE 9210518 10/1992

(Continued)

OTHER PUBLICATIONS

European Search Report, dated Feb. 26, 2009.

*Primary Examiner*—Mark Rosenbaum
(74) *Attorney, Agent, or Firm*—Kunzler & McKenzie

(57) ABSTRACT

An apparatus, system, and method are disclosed for condensing, separating and storing recyclable materials. The apparatus, in one embodiment, selects a type of recyclable material, alters the recyclable material to a condensed form and stores the recyclable material in a designated receptacle. The apparatus may include an enclosure with one or more openings to receive an item made from a recyclable material, a selection module, a plurality of form altering modules, a plurality of receptacles, and a director module to automatically direct a recyclable material, responsive to a selection made with the selection module, to one of a plurality of receptacles according to the type of material selected. A system, in one embodiment, includes a recycling appliance and one or more modular form altering devices. The modular form altering devices may be interchangeable.

31 Claims, 11 Drawing Sheets

U.S. PATENT DOCUMENTS

| | | | |
|---|---|---|---|
| 5,257,577 A | 11/1993 | Clark | 100/99 |
| 5,259,304 A | 11/1993 | Roberts | 100/99 |
| 5,297,481 A | 3/1994 | Robbins et al. | 100/193 |
| 5,415,086 A | 5/1995 | Robbins | 100/99 |
| 5,433,390 A | 7/1995 | Keeler et al. | 241/33 |
| 5,447,017 A | 9/1995 | Becher et al. | 53/527 |
| 5,513,804 A | 5/1996 | Keeler et al. | 241/16 |
| 5,813,323 A | 9/1998 | Nowak | 100/52 |
| 6,141,945 A | 11/2000 | Becher | 53/527 |
| 2004/0129810 A1 | 7/2004 | Kasprowicz et al. | 241/101.2 |

FOREIGN PATENT DOCUMENTS

| | | |
|---|---|---|
| DE | 9403770 | 6/1994 |
| DE | 4338640 | 5/1995 |
| DE | 4340857 A | 6/1995 |
| DE | 4407600 | 9/1995 |

\* cited by examiner

APPARATUS, SYSTEM, AND METHOD FOR CONDENSING, SEPARATING AND STORING RECYCLABLE MATERIAL

CROSS-REFERENCES TO RELATED APPLICATIONS

This application claims priority to U.S. Provisional Patent Application No. 60/567,600 entitled "APPARATUS, SYSTEM, AND METHOD FOR CONDENSING, SEPARATING AND STORING RECYCLABLE MATERIAL" and filed on May 3, 2004 and U.S. Provisional Patent Application No. 60/611,661 entitled "APPARATUS, SYSTEM, AND METHOD FOR CONDENSING, SEPARATING AND STORING RECYCLABLE MATERIAL" and filed on Sep. 21, 2004 and U.S. Utility patent application Ser. No. 11/110,290 entitled "APPARATUS, SYSTEM, AND METHOD FOR CONDENSING, SEPARATING AND STORING RECYCLABLE MATERIAL" and filed Apr. 20, 2005 for Jody Langston, which are incorporated herein by reference.

BACKGROUND OF THE INVENTION

1. Field of the Invention

This invention relates to devices for storing recyclable materials and more particularly relates to appliances for condensing, separating and storing recyclable materials.

2. Description of the Related Art

Each American generates approximately four pounds of refuse daily. The majority of this refuse consists of solid, recyclable items that often end up in landfills. In the past thirty years, as landfills continue to fill, government agencies world-wide have taken an active role in passing legislation to require recycling. Though recycling is a beneficial practice, the actual process of collecting recyclable materials, separating the different types of recyclable materials, and storing the items either for pickup or drop-off can be a troublesome ordeal. In addition, soiled refuse can become a breeding ground for vermin and bacteria, which can be unsanitary and dangerous. Typically, households and businesses collect recyclable items and store them until the items can be delivered to a recycling center or processing facility.

In general, multiple open receptacles, such as plastic containers, cardboard boxes or paper bags, are used to retain recyclable items, such as bottles, cartons, aluminum cans, cardboard, and the like. These items are typically bulky and fill up the containers quickly. In addition, several containers are typically required to separate the different recyclable materials, such as paper, glass, plastic, cardboard, etc. It is common to see four, five, or more recycling containers or boxes lining a wall in a small kitchen or office.

The piled refuse usually resembles messy clutter or mounds of garbage, an undesirable sight to see, especially in a frequented area. The containers also easily overflow with the load of recyclable items. The overflowing items often intermingle, causing contamination of the recyclable materials. If the recyclable materials are mixed before reprocessing, the materials can no longer be recycled and are shipped to the landfill, causing recycling efforts to be wasted.

One major problem of the actual recycling process is the cost of material separation. Waste management facilities cannot, or will not bear the cost of accurate material separation, for various reasons. Consumers resent the amount of labor required to clean, condense, and store recyclable materials. Consequently, the number of landfills continues to grow, natural resources are consumed quickly, and demanding recycling efforts go wasted.

From the foregoing discussion, it should be apparent that a need exists for an apparatus, system, and method that condenses, separates and stores recyclable materials in an inconspicuous place that prevents the recyclable materials from becoming contaminated. Beneficially, such an apparatus, system, and method would reduce the volume of the recyclable materials, separate the materials into distinct types, reduce the need for manual intervention, clean the recyclable materials, and store the materials in a convenient receptacle that eliminates mess and clutter.

SUMMARY OF THE INVENTION

The present invention has been developed in response to the present state of the art, and in particular, in response to the problems and needs in the art that have not yet been fully solved by currently available recycling devices. Accordingly, the present invention has been developed to provide an apparatus, system, and method for condensing, separating, and storing recyclable materials that overcome many or all of the above-discussed shortcomings in the art.

The apparatus to condense, separate, and store recyclable materials contains a plurality of modules configured to functionally execute the necessary steps of preparing recyclable items for recycling. These modules in the described embodiments include a selection module, one or more form altering modules, a director module, a cleaning module, a communication module, a control module, and a safety module.

The apparatus, in one embodiment, receives a recyclable item or material into an opening in an enclosure, selects the type of recyclable material, condenses the form of the recyclable material, and directs the recyclable material to a receptacle for storage. The apparatus may include an enclosure, one or more openings in the enclosure, a selection module, a plurality of form altering modules, a plurality of receptacles, and a director module for directing a recyclable material to one of the plurality of receptacles according to the type of material selected. In certain embodiments, the item or material may be selected by the selection module. In one embodiment, the selection module receives input from a user. Alternatively, the selection module may automatically select the type of material. The selection made by the selection module may determine the manner in which the recyclable material is condensed and stored.

The apparatus is further configured, in one embodiment, to alter the form of the recyclable material received into an opening in the enclosure. In one embodiment, the form altering module condenses the volume of the item or material received to prepare the recyclable material for storage and/or eventual reprocessing. In one embodiment, a form altering module includes one or more heating modules to melt the recyclable material into a condensed form. Other embodiments may include a mechanism to produce a sonic blast, a hydraulic powered mechanism, cutters, shredders, crushers and the like. A safety module may guard the form altering module in certain embodiments.

In a further embodiment, the apparatus automatically directs the recyclable material, responsive to a selection made by the selection module, to one of a plurality of receptacles according to the type of material selected. In one embodiment, the director module directs a chute to a designated receptacle. Alternatively or in addition, the director module may direct one or more receptacles in order to enable a receptacle to receive a selected material.

A system of the present invention is also presented to condense, separate, and store recyclable materials. In particular, the system, in one embodiment, includes an appliance for condensing, separating, and storing recyclable materials, one or more modular form altering devices, and one or more receptacles for receiving a selected type of recyclable material for storage. A user may easily remove and install a modular form altering device to create a recycling appliance in accordance with the needs and desires of the user.

A method of the present invention is also presented for condensing, separating, and storing recyclable materials. The method in the disclosed embodiments substantially includes the steps necessary to carry out the functions presented above with respect to the operation of the described apparatus and system. In one embodiment, the method includes providing a recycling appliance, inserting a recyclable material and selecting a type of recyclable material, condensing the form of the recyclable material, and directing the recyclable material to a receptacle. The method also may include verifying the recyclable material, cleaning and drying the recyclable material, and monitoring the conditions of the recyclable material and the surrounding environment.

In a further embodiment, the method includes interchanging modular form altering devices and melting recyclable materials. Recyclable materials may be processed to a condensed form that is easily stored and reprocessed. Many of the functional processes of the present invention may be automatic, requiring minimal operator intervention.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention prepares recyclable materials for reprocessing by proving an appliance that is simple, aesthetically pleasing, and convenient to use. The condensed recyclable materials may be sanitized and easily managed. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
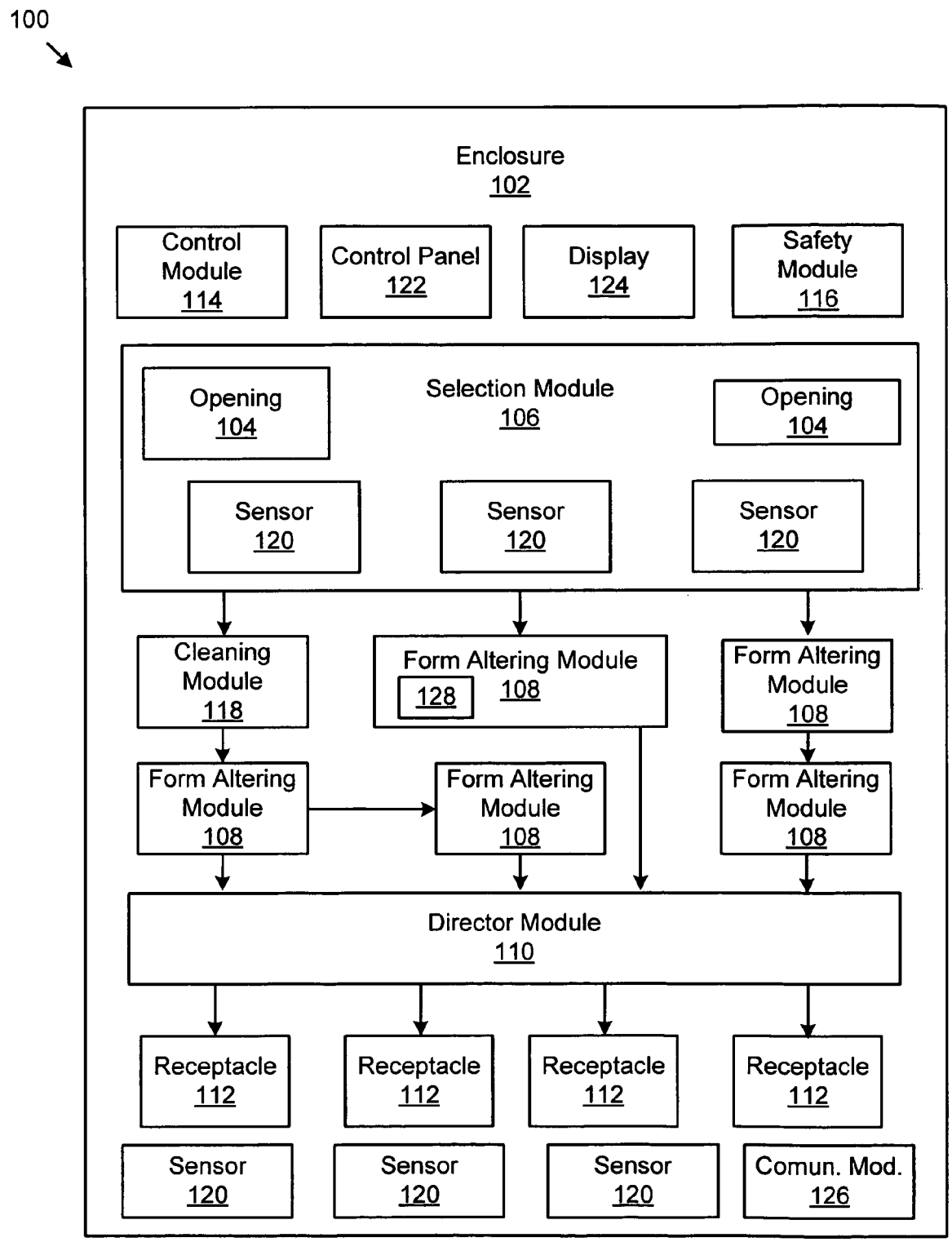
FIG. 1 is a schematic block diagram illustrating one embodiment of a recycling appliance of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a recycling appliance 100 of the present invention. The appliance 100, as illustrated, includes an enclosure 102, one or more openings 104, a selection module 106, a plurality of form altering modules 108, a director module 110, and receptacles 112. Certain embodiments may further include a control module 114, a safety module 116, a cleaning module 118, sensors 120, a control panel 122, a display 124, and a communication module 126. The plurality of receptacles 112 may receive a selected type of recyclable material that has been condensed, cleaned and sorted for storage. Multiple modules may be combined to accomplish the objectives of the invention. Furthermore, one or more receptacles 112 may be selected to receive non-recyclable materials.

Figure 2:
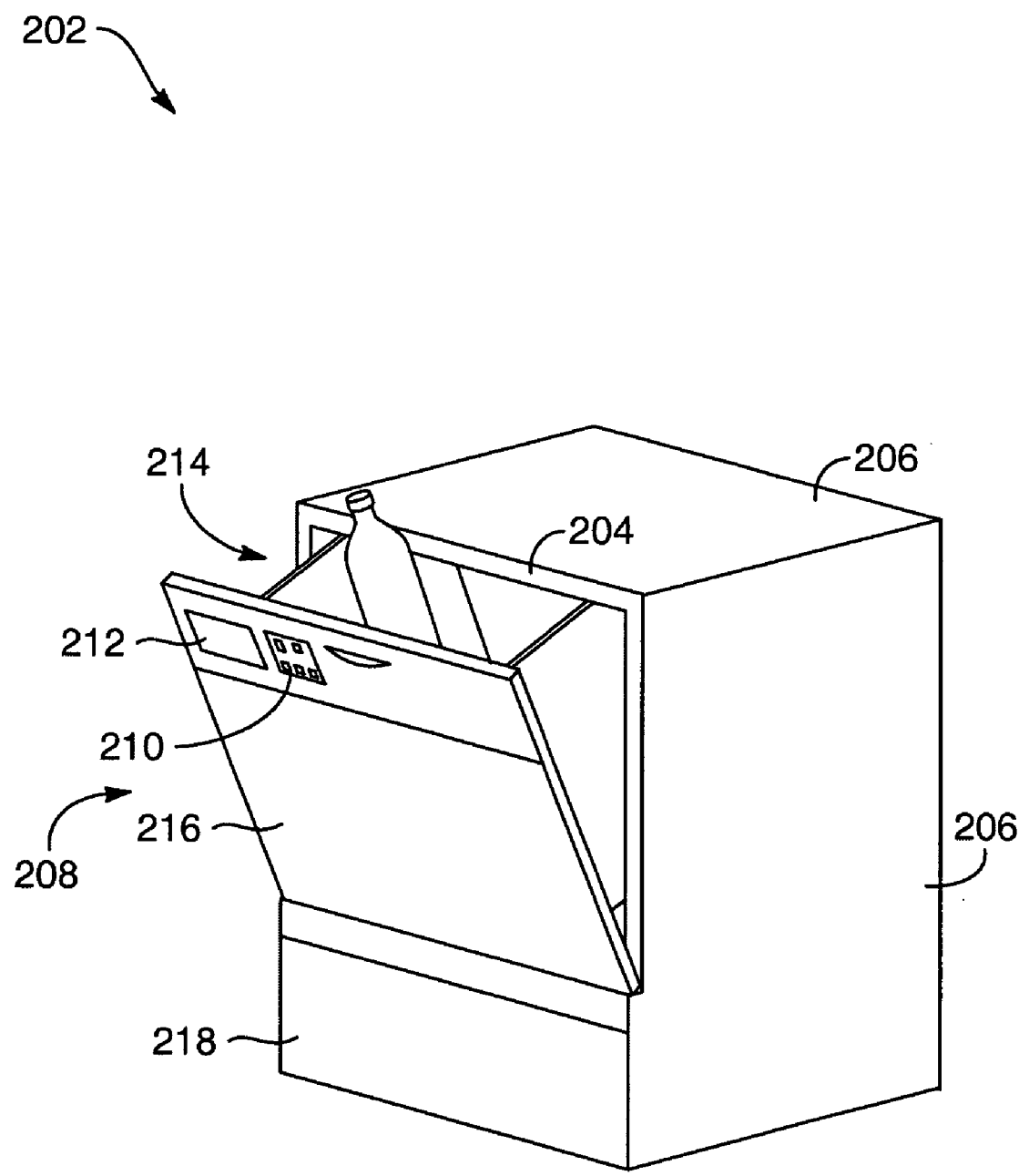
FIG. 2 is a perspective view of one embodiment of an open enclosure in accordance with the present invention.
Figure 3:
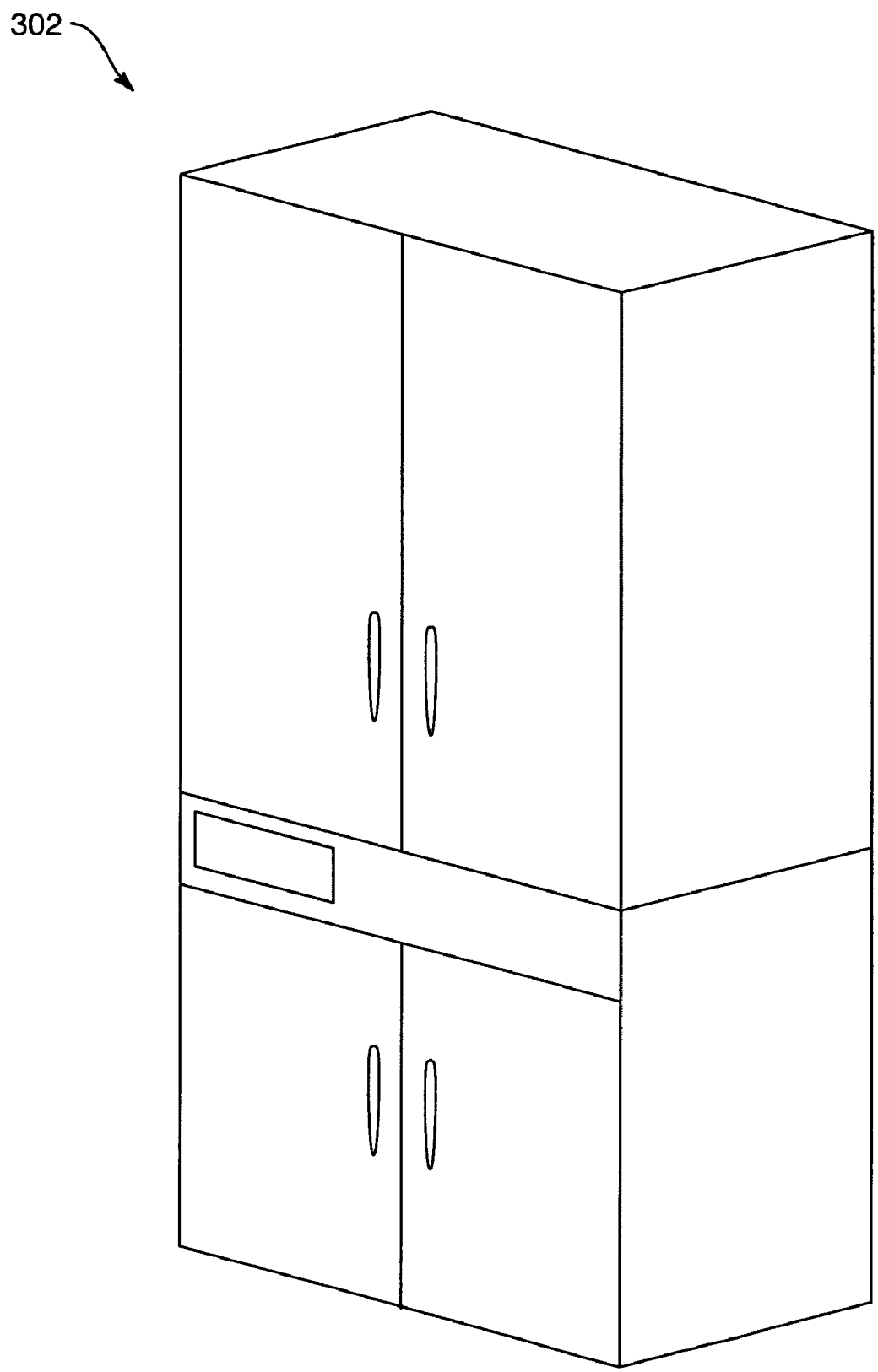
FIG. 3 is a perspective view of an alternative embodiment of an enclosure in accordance with the present invention.

FIG. 2 illustrates one embodiment of an enclosure 202. The enclosure 202 may fit into a relatively small room, such as a kitchen or a break room, and may resemble a dishwashing machine or a large paper shredder. In one embodiment, the enclosure 202 fits under a kitchen counter. In a commercial embodiment, the enclosure 202 may be larger, resembling a refrigerator or the like, similar to the enclosure 302 illustrated in FIG. 3. The enclosure 202 may comprise a frame 204, an outer covering 206, and a front 208. The frame 204 may be made from a sturdy, durable material, such as cold-rolled, mild steel and the like, and may be die stamped and robot machined and finished. The outer covering 206 may comprise steel sheet. The front 208 may be steel, or stainless steel in select embodiments. The frame 204 may be bolted together from individual roll formed or stamped elements. In certain embodiments, the materials and/or design may be selected for weatherability. Consequently, the appliance 100 may be safely stored outside if desired.

The enclosure 202 may also include a control panel 210 and/or a display 212 to enable a user to direct the processes within the enclosure 202. In one embodiment, the user may press one or more buttons to activate the selection module 106, to select a method of condensing, to remove a receptacle 112, and the like. An interface mechanism, such as the control panel 210, may further enable the operator to communicate with the control module 114 of FIG. 1.

The control module 114 may be configured to receive input and to direct activities related to internal processes. The control module 114 may additionally monitor a condition and produce a response. In one embodiment, the control module 114 controls a power-up system diagnostics and displays the status on the display 212. The control module 114 may further direct commands to each module, which may be based on a firmware "script." In one embodiment, the control module 114 monitors internal feedback in order to assure that operations are completed correctly. In addition, the control module 114 may calibrate sensors 120 periodically to ensure measurement accuracy. If an abnormal condition is detected, such as a full receptacle, technical problems, a condition requiring user intervention, illegal operations, or the like, the control module 114 may notify a user. In one embodiment, the control module 114 may further communicate with a communication module 126.

The communication module 126, in certain embodiments, may enable the appliance 100 to connect to a network or the like in order to enable remote communication. In one embodiment, the communication module 126 includes a modem to enable the control module 114 to autodial a specified authorized service center for modem diagnoses of functional problems. Thus, a repair technician may quickly identify any malfunctions and may easily correct fixable problems. Monitoring operating conditions and internal processes assures safe operation and protects against potentially harmful conditions, which may negatively affect either the appliance 100 or a user.

The display 212 (See FIG. 2) may comprise en electronic display in certain embodiments. In one embodiment, the display 212 is a vacuum fluorescent display. In an alternative embodiment, the display 212 is a liquid crystal display. The display 212 enables a user to view information transmitted from the control module 126.

One or more openings 214 in the enclosure 202 may enable a user to place a recyclable material into a receiving area to be condensed, separated and stored. The enclosure 202 may or may not include a door or covering 216. In the depicted embodiment, the covering/door 216 hinged to the enclosure 202 covers the opening 214 and prevents interruption during operation. In an alternative embodiment, the covering 216 comprises a roller assembly similar to a drawer with a designated receiving area for loading a recyclable item. In certain embodiments, the door/covering 216 locks once an item is received into the enclosure 202.

The enclosure 202 may additionally comprise one or more openings 218 to permit access to the receptacles 112. In the depicted embodiment, the receptacles 112 may be concealed within a drawer 218 located near the bottom of the enclosure 202. A user may accordingly open the drawer to remove a receptacle 112 or to remove the contents of a receptacle 112.

The enclosure 202, in certain embodiments, may include a single opening 214 for receiving a recyclable material. In one embodiment, the user manually selects the type of recyclable material by making a selection with the control panel 210. Alternatively, the selection module 106 may automatically identify or select the type of recyclable material. For example, a plastic milk container may be placed into the opening 104, and the selection module 106 may identify the container as a #2 HDPE recyclable material. The selection module 106, in conjunction with the director module 110, may subsequently direct the item according to the type of recyclable material selected.

The selection module 106 may include sensors 120 and/or other devices to automatically identify the type of recyclable material. In one embodiment, an ultra sonic sensor is used to detect the shape, proportion, and/or composition of the recyclable item. In a contemplated embodiment, a pinger, or a pulse generator used for echo sounding in sonar, mechanically shocks the recyclable item and passes the resulting pressure to the control module 114. The control module 114 subsequently compares the received pressure return to approved return signatures. If a match is found, the recyclable item is approved for processing. Otherwise, the item is rejected from further processing.

Figure 5A:
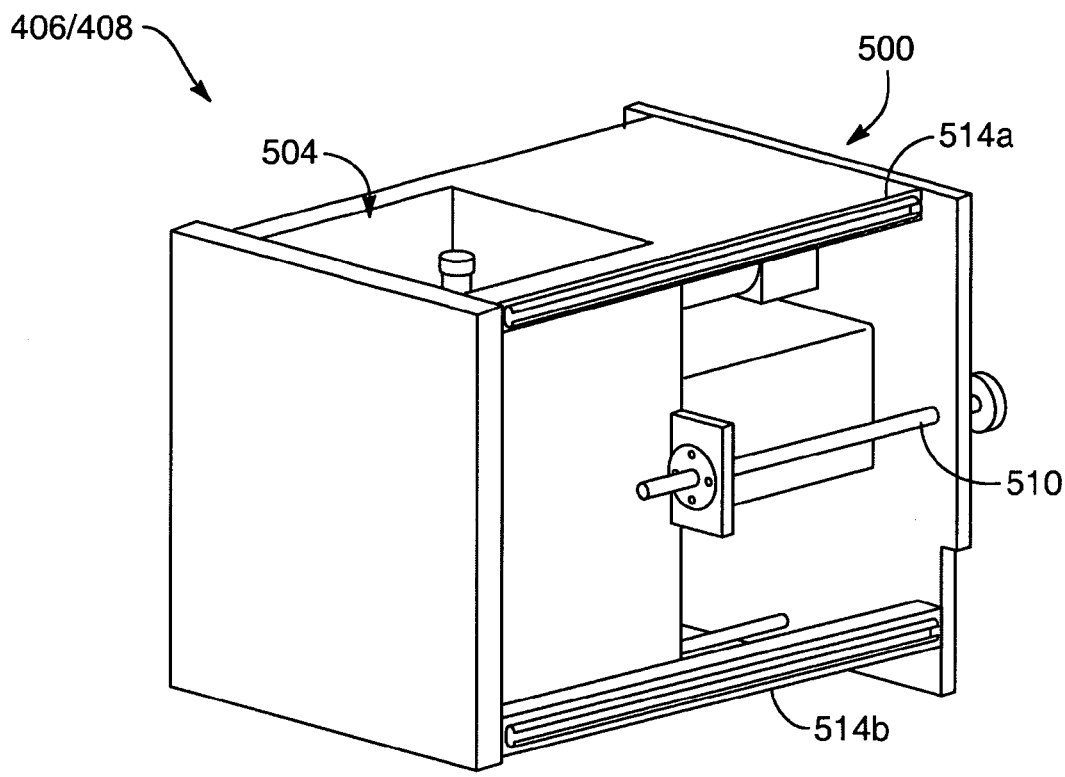
FIG. 5A is a perspective view of one embodiment of a crusher in accordance with the present invention.
Figure 5B:
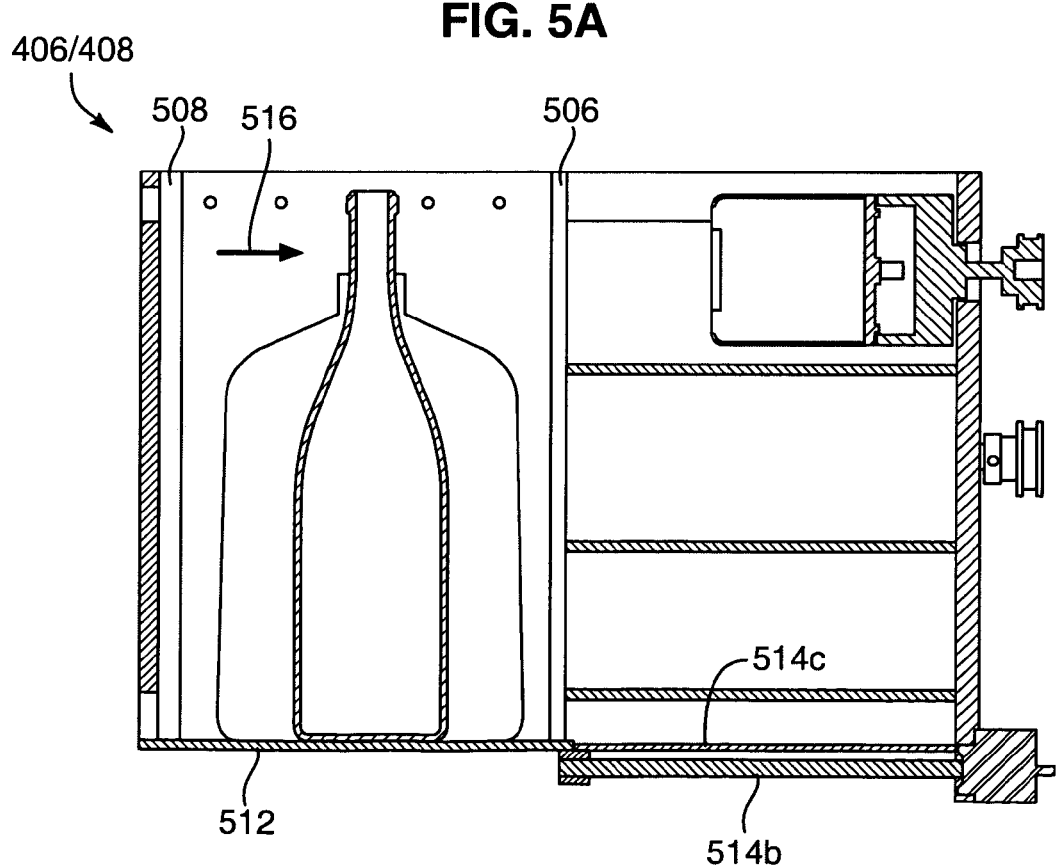
FIG. 5B is a side view of the crusher of FIG. 5A.

In another embodiment, the opening 104 may be shaped to receive a specific type of recyclable material or item (See FIG. 5B). Accordingly, the selection module 106, in one embodiment, determines the position of the item and verifies that the item is an acceptable recyclable item. If an item is identified as a non-recyclable material or unacceptable item, the selection module 106 may reject the item, or the item may be directed toward an alternate processing path and/or a receptacle for non-recyclable items. The selection module 106 may additionally position the item for further processing in a form altering module 108.

A form altering module 108 reduces the size of the recyclable material to prepare the recyclable material for storage. Traditionally, boxes, cartons, soda cans, plastic containers and the like are flattened to conserve space. One method commonly used to flatten the items is to step on the item or compact the item in a compactor. The form altering module 108 more efficiently condenses the recyclable materials using a variety of technologies. Each form altering module 108 may be a separate type of recycling device. Such devices include, for example, shredders, crushers, compactors, cutters, burners, lasers, and the like. Those of skill in the art will recognize that a variety of devices and/or technologies may be used and/or combined to accomplish the task of condensing recyclable materials.

In one embodiment, the selection module 106 comprises a transport carousel for conveying a recyclable item to a selected module, such as a cleaning module 118 or a form altering module 108. In one embodiment, a recyclable item is placed into an opening 104 with an open end down onto a support wand. The position of the item and/or other characteristics may be verified by optical sensors. If the item is verified, the carousel advances to position the item for further analysis. If the item is not verified, in certain embodiments, the carousel does not proceed. In addition, instructions may be communicated to a user, for example, to remove or reposition the item. The verification process may prevent non-recyclable items, such as aerosol cans, from entering the recycling processing system or from being condensed in a form altering module 108.

Alternatively, a plurality of openings 104 may facilitate part of the selection process. For example, one opening 104 may be configured to receive paper products; another opening 104, metals; another, glass; another, plastic; and so on. The selection module 106 may be utilized to determine a type of recyclable material within a determined category. For instance, the selection module 106 may be used to select a color of glass (e.g., brown, green, and clear) received into an opening 104 designated for glass. In one embodiment, a chromatic analyzer analyzes the spectral content of light passed through the glass. In another embodiment, metal cans are tested according to an electromagnetic test. If the can "sticks" to the test area, then the can is classified as steel. Otherwise the can is classified as a non-ferrous metal, such as aluminum. The selection module 106, in conjunction with the director module 110, subsequently separates the different colored glass or the different types of metals to prevent the materials from mixing and becoming contaminated.

Figure 4:
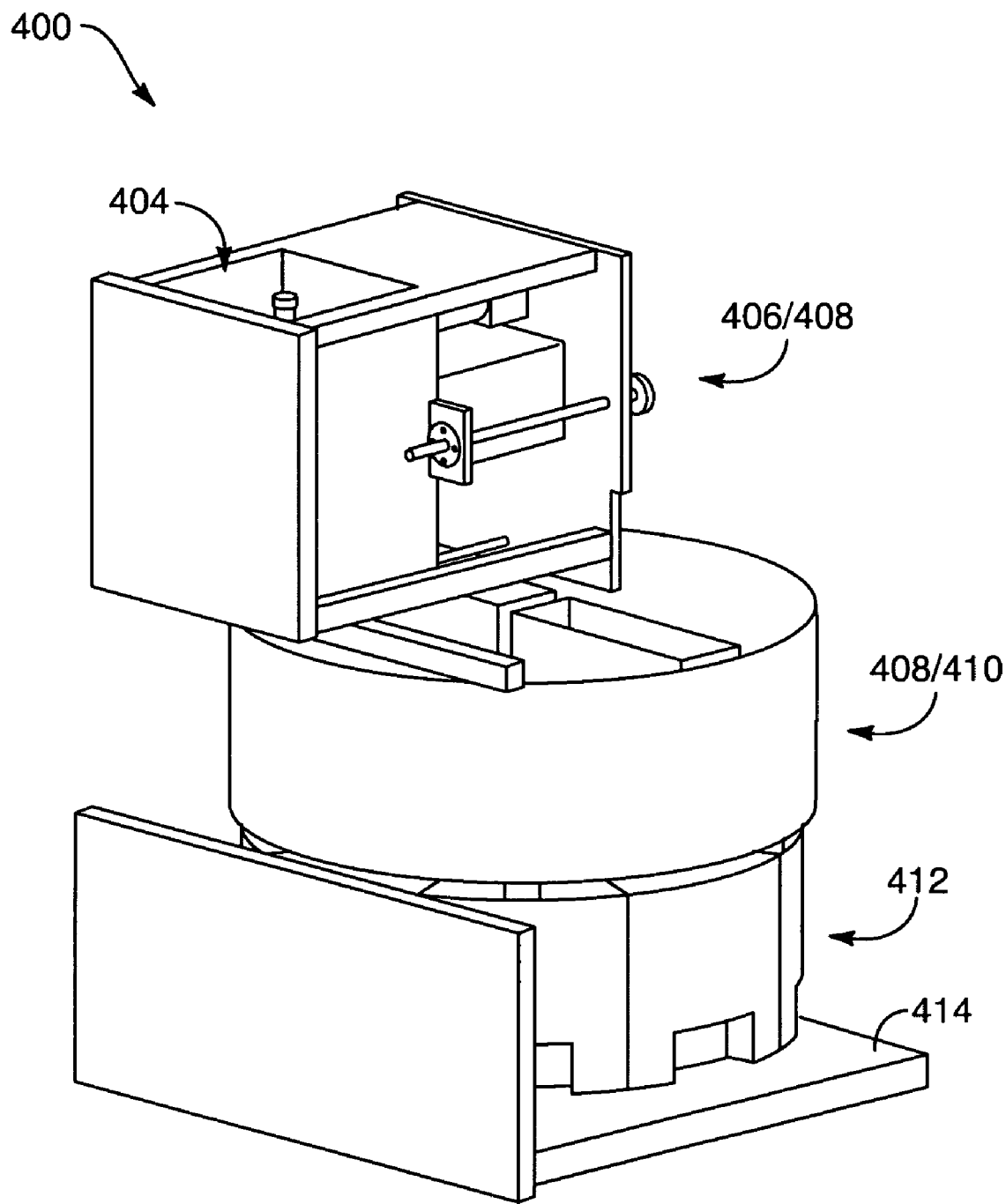
FIG. 4 is a perspective view of one embodiment of interior components of a recycling appliance in accordance with the present invention.

FIG. 4 illustrates one embodiment of internal components of a recycling appliance 400. The appliance 400 includes an opening 404, a selection module 406 combined with a form altering module 408, a director module 410 combined with a form altering module 408, and receptacles 412 disposed within a drawer 414. A recyclable material passes from the opening 404 where the material is selected for processing in the form altering module 408.

FIGS. 5A and 5B illustrate in greater detail one embodiment of the selection module 406 combined with a form altering module 408 of FIG. 4. In the depicted embodiment, the selection module 406 is triggered by a user placing an item within an opening 504 and receives a selection of a type of recyclable material. The form altering module 408 may include a crusher 500 for crushing aluminum cans, glass, plastic, and the like. The crusher, as depicted, includes a moving platen 506, a fixed platen 508, a plurality of power screws 510, a retaining shelf 512, and a plurality of roller support systems 514. The moving platen 506 is drawn down to a fixed platen 508, using two linked power screws 510. The crusher may operate in a horizontal orientation with a first roller support system 514a to guide and support the mechanism, the power screws 510 providing the crushing force. A second roller system 514b may enable the unit to be opened and closed like a drawer. Accordingly, the user may load items from the top of the unit, perpendicular to the crush axis 516. A third roller system 514c may facilitate opening and closing the retaining shelf 512.

In one embodiment, the retaining shelf 512 holds the recyclable item(s) in the crushing area during loading and during crushing. Once the materials have been sufficiently condensed, the retaining shelf 512 retracts to permit the materials to drop to the next level. The crusher preferably flattens the incoming item for further processing or for storage. In one embodiment, compacted items, depending on the material selected, are directed to a shredder to enable the recyclable material to lay flat during storage, thereby conserving as much space as possible. In certain embodiments, the crusher may be made of chromium steel for toughness, hardness, and corrosion resistance.

Figure 6:
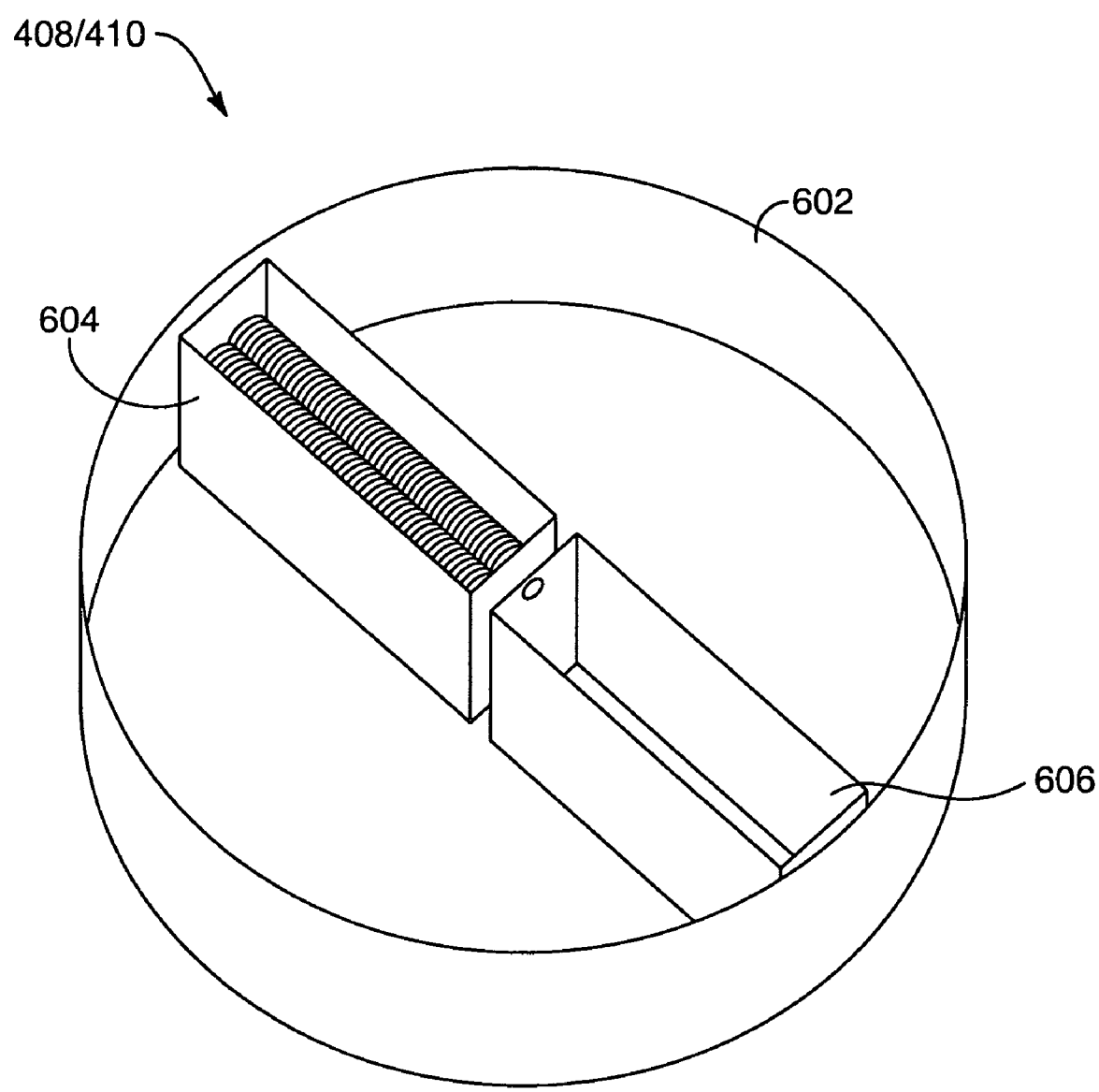
FIG. 6 is a perspective view of one embodiment of a turntable in accordance with the present invention.

FIG. 6 illustrates in greater detail one embodiment of a form altering module 408 combined with a director module 410 of FIG. 4. The depicted form altering/director module 408/410 includes a turntable 602, a shredder assembly 604, and a chute 606. The shredder assembly 604 is mounted to the guide turntable 602, which directs the recyclable item to a designated receptacle. The guide turntable 602 provides one or more chutes 606 to enable a recyclable material to pass from the crusher 500 (See FIG. 5A) or other feed to a receptacle. The guide turntable 602 provides two positions: pass through or shred. If an item is already pulverized, such as glass, the guide turntable 602 may be positioned to allow the glass to slide through the chute 606 straight to a receptacle. If the product is flattened, such as plastic or cardboard, the guide turntable 602 may be positioned to shred the item in the shredder 604 before passing the reduced particles to the proper receptacle.

Of course, other types of form altering modules 108 may also be used. In a contemplated embodiment, the form altering module 108 designated to reduce the size of glass comprises a crusher that uses a hydraulic quick force to granulize the recyclable material. In an alternative embodiment, the form altering module 108 employs an ultra sonic blast to break glass into tiny bits. In yet another embodiment, the form altering module 108 includes a platter with a hammer-knife that changes positions for different types of processing. The knife may be rotated outward for cutting plastics, rotated in for crushing cans and the like, and the hammer may be rotated outward for crushing glass.

For plastic, the form altering module 108 may comprise a compactor similar to a cone crusher that smashes the plastic item. In addition, the form altering module 108 may further include blades to shred the plastic into small pieces after being smashed. The plastic pieces may then be easily stored in a receptacle 112. Alternatively or in addition, the plastic may be melted as will be discussed in greater detail below.

Paper products may be condensed by a form altering module 108 configured to shred the paper with blades as is known in the art. Furthermore, the form altering module 108 may further include multiple sized blades to cut thick paper products, such as cardboard and the like. In one embodiment, the paper products may further be compacted after being shredded. A paper compactor, in one embodiment, may include a single paddle that compresses the shredded paper product from the back of a compartment.

In one embodiment, a separate opening 104 is designated for receiving flat recyclable paper products and/or pane glass. Paper products may be directed to a shredder, such as shredder 604 in FIG. 6. Pane glass received through the opening 104 may be crumbled and passed to a crusher to pulverize the remaining pieces of glass, and then directed to a designated receptacle.

The form altering module 108 may further include mechanisms or sensors 120 to monitor the condition of the form altering module 108 and/or the recyclable material. For example, if an item gets caught in the condensing mechanism or when the form altering module 108 has completed processing a recyclable item, a notification may be sent to the control module 114 and/or to a user. Preferably, the form altering module 108 condenses the recyclable material quickly, quietly, and uniformly with minimal energy consumption. Also, the form altering module 108 is preferably protected from user contact.

Typically, once the form altering module 108 reduces the size of the recyclable material for storage, the director module 110 directs the recyclable material to a storage receptacle 112. The director module 110 preferably responds to a selection made with the selection module 106. For example, if a green colored glass is selected with the selection module 106, the director module 110 would direct the green glass material to a receptacle 112 designated for green glass. Alternatively, if brown glass is selected, the director module 110 would direct the brown glass material to a receptacle 112 designated for brown glass. The director module 110 separates the recyclable materials to prevent the materials from being mixed.

In one embodiment, the director module 110 moves to position a recyclable material above a receptacle 112 relative to a selection made with the selection module 106. Once the recyclable material is altered by the form altering module 108, the material may be directed down a chute that deposits the material in a specific receptacle 112. Alternatively, the director module 110 may move the receptacles 112 to receive the appropriate recyclable material. Further still, the form altering module 108 may be directed to deposit the recyclable material accordingly. In another embodiment, an item placed on a support wand reaches an intersection of a guide belt and an entry ramp. A transfer fork driven by a transfer motor slides the support wand with the recyclable item onto an entry ramp. The recyclable item rides the support wand into a subsequent station or to a designated receptacle. Those of skill in the art will recognize that various methods may be used to direct a selected recyclable material to an appropriate receptacle 112.

Figure 7A:
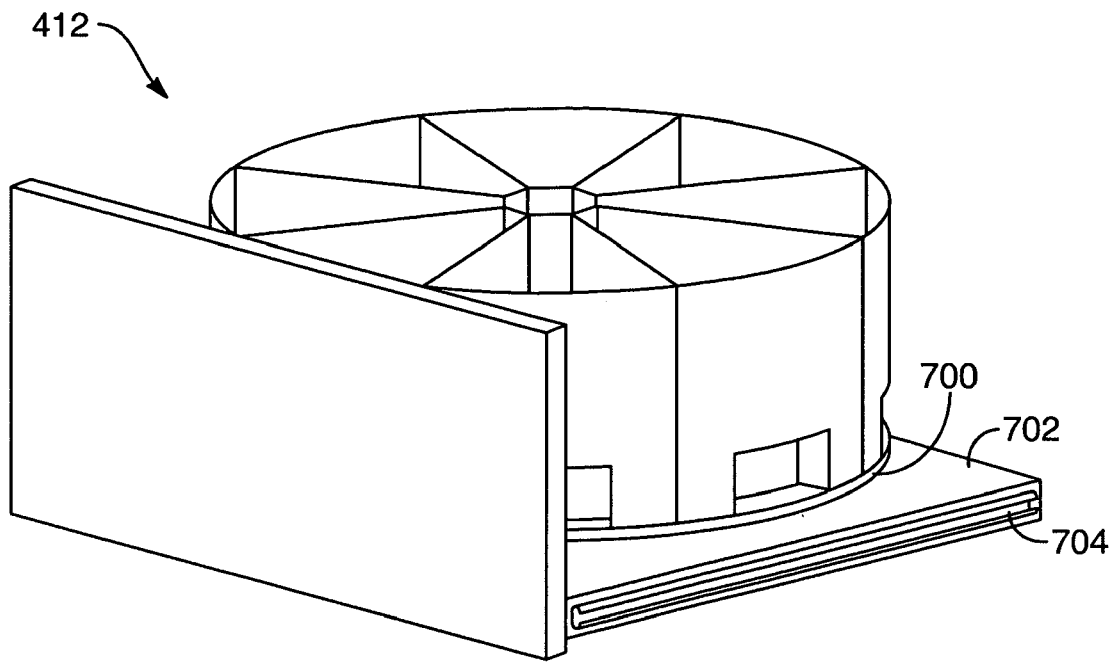
FIG. 7A is a perspective view of one embodiment of a plurality of receptacles in accordance with the present invention.
Figure 7B:
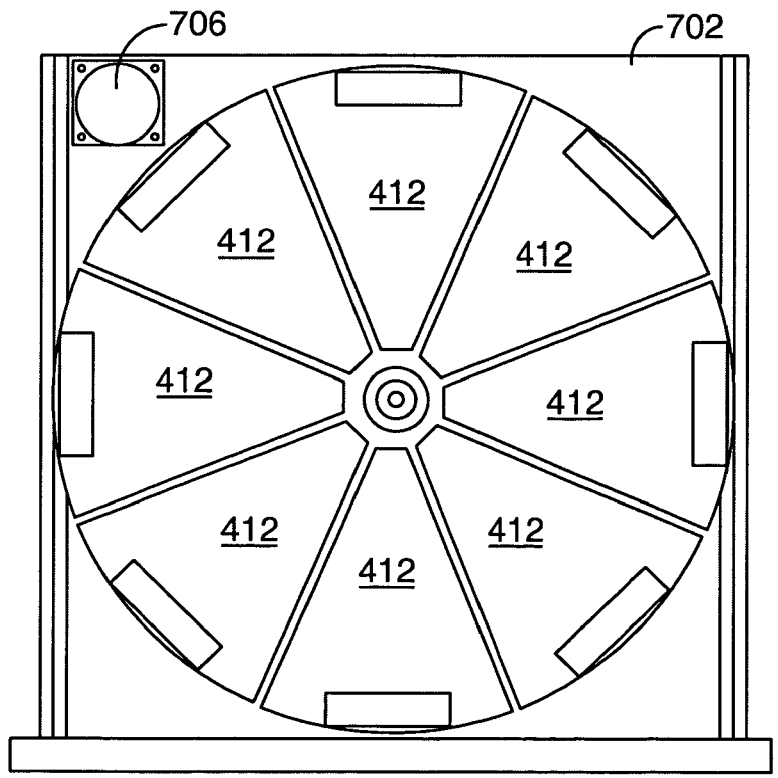
FIG. 7B is a plan view of one embodiment of a plurality of receptacles in accordance with the present invention.

FIGS. 7A and 7B illustrate in greater detail one embodiment of receptacles 412 illustrated in FIG. 4. The depicted receptacles 412 are arranged on a circular turntable 700 disposed within a large drawer 702. The turntable 700 may be powered by a gear motor 706. In addition, the receptacles 412 may be monitored by one or more sensors 120. The receptacles 412 may be pie shaped, as illustrated, and may be sized or proportioned according to need. For example, a larger receptacle 412 may be designated for paper products while a smaller receptacle 412 may be designated for colored glass. A larger receptacle 412 may occupy the space of three or four smaller receptacles 412 in certain embodiments. The turntable 700 may rotate the receptacles 412 to position the receptacles 412 below a chute 606 of a turntable 602 disposed above the receptacles 412 (See FIG. 4). Passage between layers may be monitored by a plurality of thru-beam light sensors or the like. The sensors 120 may verify that materials have not jammed within the unit.

The receptacles 412 may be removable for easy cleaning and removal of content. In one embodiment, the drawer 702 comprises a rail system 704 with rollers to allow the receptacles 412 to be pulled out to an extended position. In an alternative embodiment, the receptacles 112 may be attached with a hinge to allow the receptacle 112 to pivot on the hinge. In a further embodiment, the receptacles 112 may be automated to remove the recyclable materials.

Sensors 120 may monitor the amount of stored recyclable materials. In one embodiment, when compacted materials exceed a predetermined amount, a response notifies a user to remove the receptacle 112 and/or to remove a filled bag from the receptacle 112. In the depicted embodiment, the turntable 700 (See FIG. 7A) may automatically position a receptacle 412 for easy removal in response to a sensor event. In addition, an alarm may sound and/or a message may be displayed, and further processing may be stalled until the receptacles 412 are in a proper condition to receive additional recyclable materials. In certain embodiments, the receptacles 412 may lock out user access while recyclable materials are being processed.

A receptacle 412, in one embodiment, is a bin lined with a durable plastic bag. The plastic bag may be similar to the biohazard bags used to contain hazardous items, such as needles, broken glass, and the like. Suitable bags may be available from companies such as Scientific Commodities, Inc., Lake Havasu City, Ariz. In certain embodiments, the plastic bags may be sealable. Alternatively, a receptacle 112 may be any receptacle suitable for receiving an item, such as a cardboard box, plastic garbage can, or the like. In certain embodiments, the receptacle 112 may simply be a plastic bag. A variety of receptacles 112 may be used and/or combined. The receptacles 112 are not limited by size, shape, material, or number.

Furthermore, the receptacles 112 may be situated in a variety of configurations within the enclosure 102 of a recycling appliance 100. Receptacles 112 may be aligned along the bottom of an enclosure 102. Alternatively or in addition, the receptacles 112 may be vertically stacked. Preferably, the receptacles 112 are compact to conserve space. In certain embodiments, the receptacles 112 are small to enable the user to easily manage the recyclable contents and to enable separation and storage of numerous types of recyclable materials if desired.

In certain embodiments, a safety module 116 (See FIG. 1) may protect the appliance from unauthorized access in order to prevent damage. In one embodiment, a safety module 116 restricts access to the appliance 100 during operation. For example, if an item has been inserted into the appliance, a door or covering may lock automatically to prevent the user from prematurely inserting another item or from reaching into a form altering module 108, such as a shredder, compactor, or heating module 128, while active. Locking all openings 104 further prevents misdirection of recyclable materials as well as cycle interruption, if applicable. In one embodiment, the safety module 116 may require a security or access code for activation to prevent unauthorized users, such as children, from operating the appliance 100.

Figure 8:
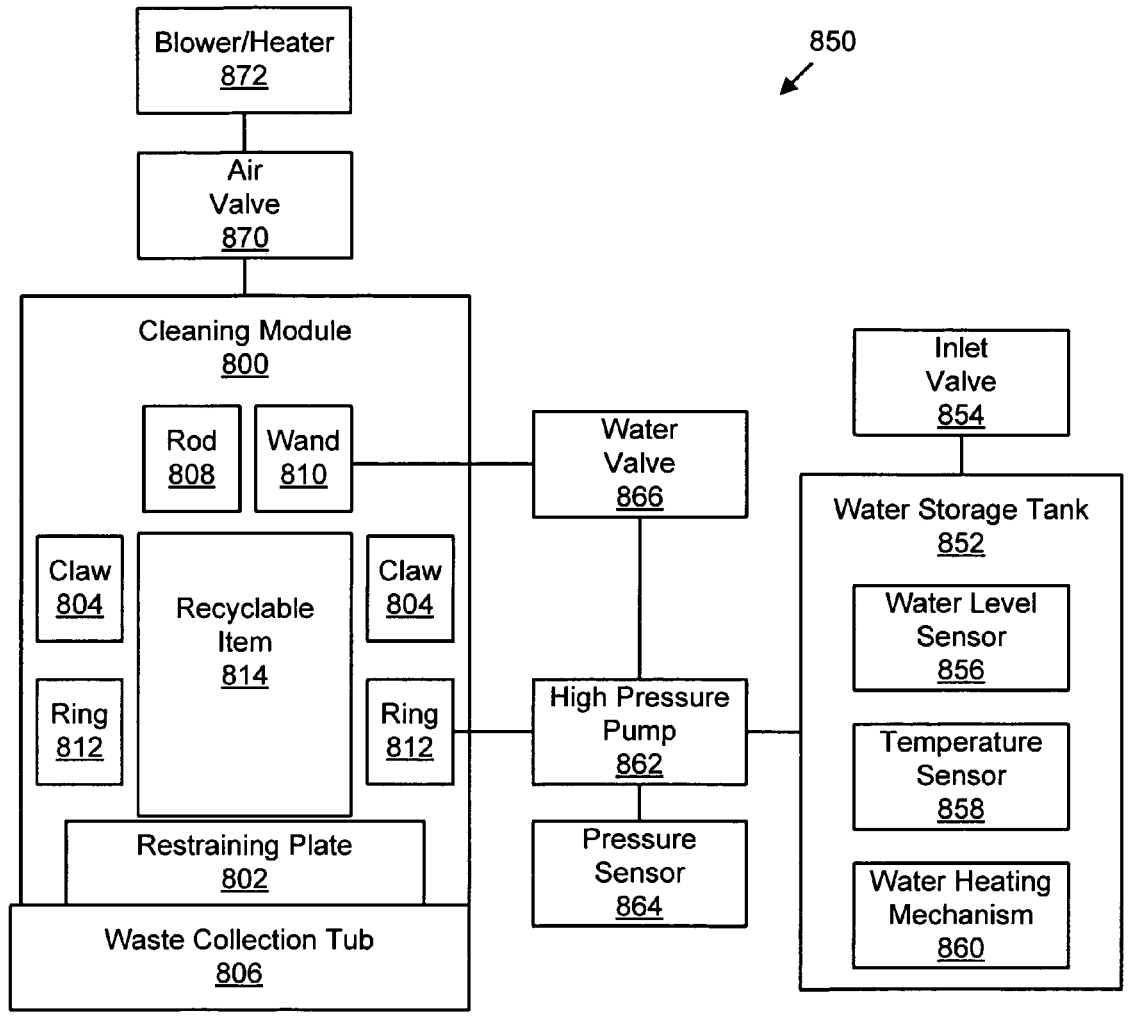
FIG. 8 is a schematic block diagram illustrating one embodiment of a cleaning module and a fluid control system in accordance with the present invention.

FIG. 8 illustrates one embodiment of a cleaning module 800 and a fluid control system 850. In certain embodiments, the appliance 100 may further comprise a cleaning module 800, such as the cleaning module 118 of FIG. 1, to clean the recyclable materials. In addition, the cleaning module 800 may further be configured to clean the appliance 100 and associated components. An item may be directed from the selection module 106 to a cleaning module 800 to remove debris and/or non-recyclable materials before condensing and depositing the material into a designated receptacle 112. Alternatively, the item may be condensed and then cleansed before storage.

A cleaning module 800 may include multiple mechanisms to remove non-recyclable materials such as debris, labels, caps, cap rings, and the like. In one embodiment, a cleaning module 800 includes a restraining plate 802, one or more grappling and cutting claws 804, a waste collection tub 806, a pry rod 808, a center wand 810 and a bustle ring 812. In the illustrated embodiment, an item 814 is received into the cleaning module 800 and is secured into position by a restraining plate 802. Grappling and cutting claws 804 may be directed along the neck of the item to pull and cut any caps and/or rings from the neck of the item 814. The cap and/or ring may be subsequently discarded into a waste collection tub 806. A pry rod 808 may be inserted into the mouth of an item 814 and twisted sideways to remove any spout inserts, which may also be deposited in the waste collection tub 806.

To wash the item, according to one embodiment of the present invention, a fluid control system 850 may be implemented. The fluid control system 850 may include a water storage tank 852, an inlet valve 854, a water level sensor 856, a temperature sensor 858, a water heating mechanism 860, a high pressure pump 862, a pressure sensor 864, and a high pressure water valve 866.

The inlet valve 854 enables water to fill the storage tank 852, which may include heating mechanisms 860 and temperature sensors 858 to heat the water sufficiently. The water level may be monitored by the water level sensor 856. The high pressure pump 862 builds up the water pressure in a water line as determined by the pressure sensor 864. Subsequently, a high pressure water valve 866 may be opened to power a center wand drive and/or a bustle ring drive. High pressure water may shoot onto the item 814 from a center wand 810 and/or a bustle ring 812. Corresponding drives move the center wand 810 and the bustle ring 812 up and down the item 814 to remove all content residue, debris, and labels from off of the interior and exterior of the item respectively. All water and debris may be washed into the waste collection tub 806, where debris is caught by a drain strainer for later cleaning by the user. After the item 814 is washed, the item 814 may be dried in preparation for processing.

In one embodiment, an internal valve 870 enables forced air from a blower and heater 872 to enter the center wand 810 and bustle ring 812. The item 814 may be allowed to completely dry for a predetermined time before being directed to a form altering module 108 or a receptacle 112. Other methods and mechanisms for cleaning debris and non-recyclable materials from a recyclable item 814 are conceivable and may be implemented into the present invention.

As mentioned previously, the form altering module 108 may include a heating module 128 (See FIG. 1) for melting recyclable plastic. In a contemplated embodiment, a form altering module 108 melts plastic grocery bags or the like into a molded bar. In such an embodiment, plastic grocery bags are placed in a drawer-like enclosure. The enclosure is then closed and locked. Next, a heating element is applied to the grocery bags. The melted plastic runs into a bar-shaped mold. Once the plastic cools, the enclosure is unlocked and a solid bar of recyclable material is removed from the enclosure. In certain instances, the recyclable material may be directed by a director module 110 to a designated receptacle 112 for storage. One or more form altering modules 108 may also be a modular device that can be easily removed or coupled to the recycling appliance 100.

Figure 9:
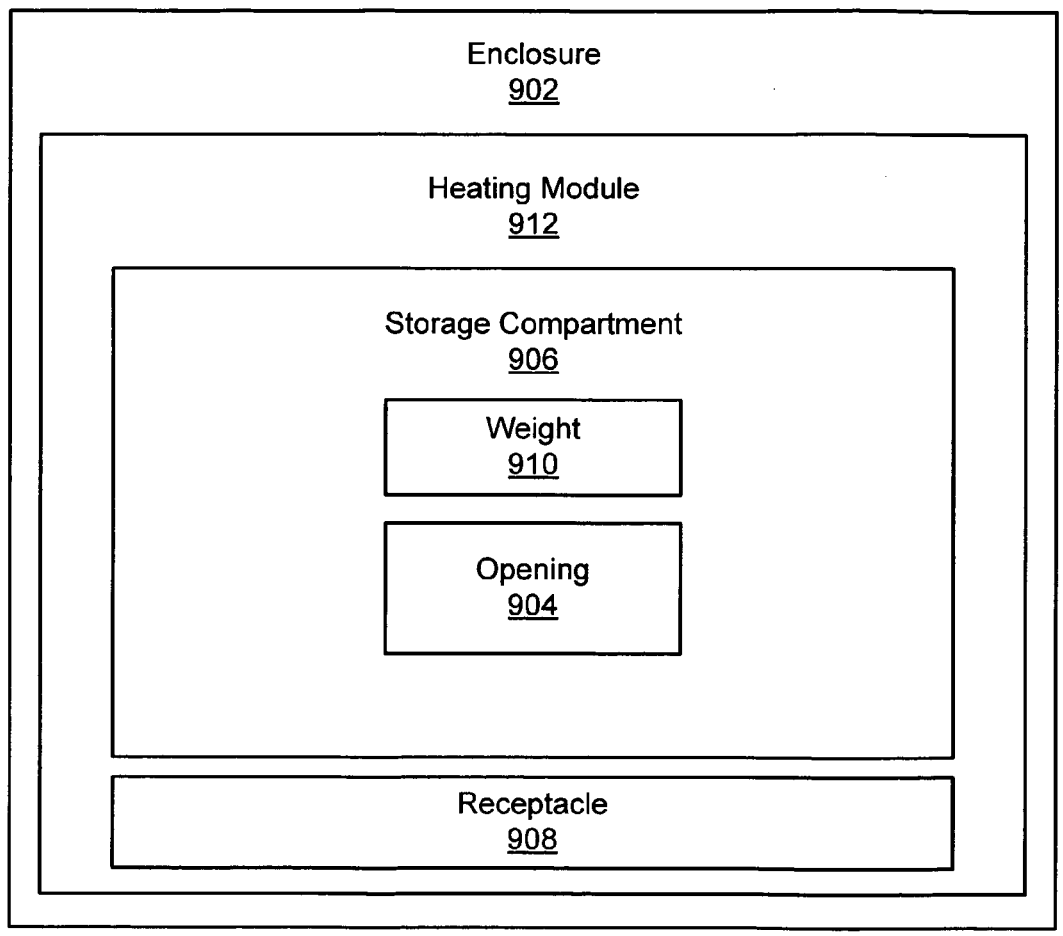
FIG. 9 is a schematic block diagram illustrating one embodiment of a modular form altering device of the present invention.

FIG. 9 illustrates one embodiment of a modular form altering device 900 for condensing, separating, and storing recyclable materials, namely plastic. The modular form altering device 900 may comprise an enclosure 902, an opening 904, an accessible storage compartment 906, a receptacle 908, one or more weights 910, and a heating module 912. The storage compartment 906, in certain embodiments, may also comprise a form altering module 108 as discussed above. For illustrative purposes, the storage compartment 906 will be discussed in conjunction with the form altering module 108 as a single module 906. In addition, the enclosure 902 may comprise the enclosure 102 discussed above in relation to FIG. 1, or alternatively, may comprise a separate enclosure 902 that may be inserted into the enclosure 102. Furthermore, the opening 904 may also comprise the opening 104 of FIG. 1. Preferably, the opening 904 enables plastic grocery bags or the like to be stored in the storage compartment 906 such that the user can readily access the items when desired.

In one embodiment, the storage compartment 906 may comprise a weight 910 positioned above the storage compartment 906. In one embodiment, the weight 910 includes a heating module 912. When the user desires the storage compartment 906 to be emptied, the heating module 912 may be activated, either by pressing a button on a control panel or by another control mechanism. In certain embodiments, an activation button may be used in conjunction with the selection module 106 discussed above in relation to FIG. 1.

In one embodiment, the weight 910 drops down on top of the recyclable material to compact the material and to release any trapped air pockets. Alternatively, other methods may be employed to compress the recyclable material to facilitate melting the material. A heating module 912 may simultaneously apply heat to the recyclable material. In one embodiment, the heating module 912 may be similar to a heating element used in a conventional oven. A heating module 912 may be located in the top weight 910 and in the bottom of the storage compartment 906. Alternatively, various heating modules 912 maybe located in the sides of the storage compartment 906, or may be a combination thereof.

Figure 10:
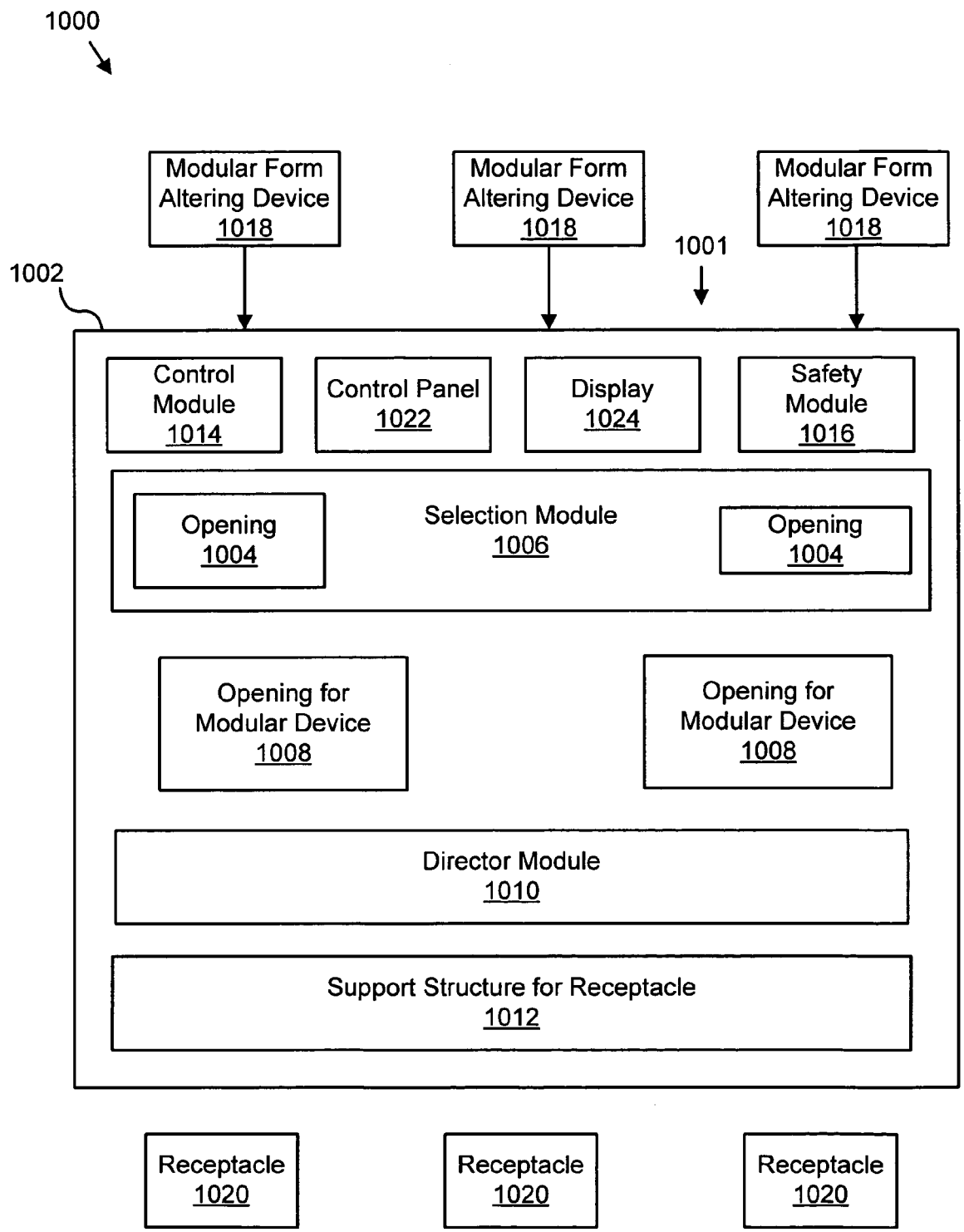
FIG. 10 is a schematic block diagram illustrating one embodiment of a recycling system of the present invention.

The heating element 912 melts plastic bags or the like stored in the storage compartment 906. The walls of the storage compartment 906, in one embodiment, may be coated with Teflon® to prevent the melted plastic from sticking to the walls. The melted plastic may be allowed to cool within the storage compartment 906, forming a hard mass of plastic. As mentioned, the plastic may be formed into a bar in certain embodiments. The hardened plastic may then be stored in a receptacle 908 to be recycled. In one embodiment, the bottom of the storage compartment 906 opens to release the hardened plastic into a storage receptacle 112. Alternatively, the user may remove the hardened plastic. The storage compartment 906 may then be used again to store plastic bags or the like. Further disclosure maybe found in related U.S. Utility patent application Ser. No. 11/110,290 entitled "APPARATUS, SYSTEM, AND METHOD FOR CONDENSING, SEPARATING AND STORING RECYCLABLE MATERIAL" and filed on Apr. 20, 2005 for Jody Langston, which is hereby incorporated by reference into this document FIG. 10 illustrates one embodiment of a recycling system 1000 of the present invention. The recycling system 1000, in one embodiment, includes a recycling appliance 1001, one or more modular form altering devices 1018, and one or more receptacles 1020. The recycling appliance 1001 may comprise an enclosure 1002, one or more openings 1004, a selection module 1006, a plurality of openings 1008 for receiving a modular form altering device 1018, a director module 1010, and a support structure 1012 for receiving receptacles 1020. The recycling appliance 1001 may further include a control module 1014, a control panel 1022, a display 1024 and a safety module 1016 as described above.

The recycling system 1000 enables a user to configure a recycling appliance 1001 according to the user's needs. For example, if a restaurant produces a lot of glass waste, but not a large volume of other types of recyclable waste, the restaurant may desire a recycling appliance 1001 with several modular form altering devices 1018 specifically designed to quickly process glass. In addition, the receptacles 1020 may also be selected and proportioned to adequately accommodate the large volume of glass material. Similarly, other types of modular form altering devices 1018 may be selected and implemented into the appliance 1001. In one embodiment, the modular form altering devices 1018 are easily installed and removed. Thus, a user may determine which modular form altering devices 1018 are necessary for specific tasks and/or situations; then, may interchange the modular form altering devices 1018 if situations change. Interchangeable modular form altering devices 1018 provide flexibility and adaptability to the present invention and enable the user to choose the best configuration for the user's needs.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Additionally, the order in which a particular method occurs may or may not strictly adhere to the order of the corresponding steps shown.

Figure 11:
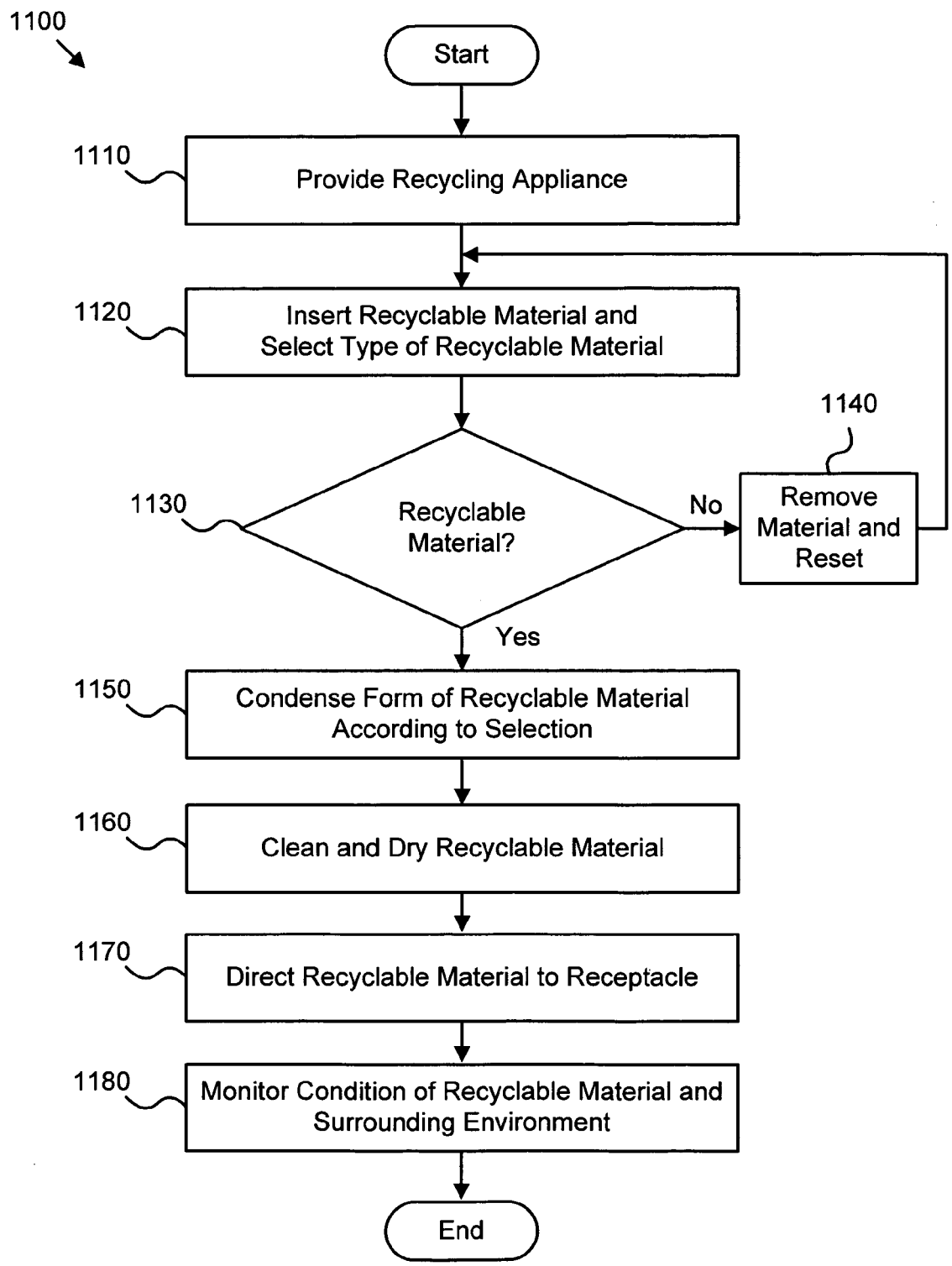
FIG. 11 is a schematic flow chart diagram illustrating one embodiment of a recycling method in accordance with the present invention.

FIG. 11 illustrates one embodiment of a recycling method 1100 of the present invention. The recycling method 1100 includes the steps of providing 1110 a recycling appliance, inserting 1120 a recyclable material into the recycling appliance and selecting a type of recyclable material, verifying 1130 the recyclable material, removing 1140 the recyclable material if the material is not verified, condensing 1150 the form of the recyclable material according to a selection made by a selection module 106, cleaning 1160 and drying the recyclable material, directing 1170 the recyclable material to a receptacle, and monitoring 1180 the conditions of the recyclable material and the surrounding environment.

The recycling method 1100 enables the user to easily condense, separate and store recyclable materials. Verifying 1130 the recyclable material ensures that proper recyclable materials are directed toward the correct receptacle for storage and eventual reprocessing. Cleaning 1160 and drying the recyclable materials prevents contamination and bacterial growth and creates sanitary storage environments. In further embodiments, the method 1100 may include interchanging modular from altering devices 1018 to tailor a recycling appliance to the needs of the user, and melting a recyclable material into a condensed form.

The recyclable material may subsequently be stored and/or transported to a processing facility. The cleaned, condensed form may be sanitary and easily managed. In addition, the user may easily process and separate recyclable items with minimal operator involvement.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An appliance for condensing, separating and storing recyclable materials, the apparatus comprising:
   an enclosure configured to store recyclable materials;
   at least one opening in the enclosure, the at least one opening configured to receive an item made from a recyclable material;
   a selection module configured to select a type of recyclable material;
   a plurality of form altering modules each configured to alter in a different manner the form of an item made from a recyclable material in response to a selection made with the selection module to prepare the recyclable material for storage;
   a plurality of receptacles connected with the at least one opening and configured to receive a selected type of recyclable material for storage; and
   a director module configured to be responsive to a selection made with the selection module to automatically direct a recyclable material to one of the plurality of receptacles according to the type of material selected with the selection module.

2. The apparatus of claim 1, further comprising a control module configured to receive input and to direct activity related to internal processes of the appliance.

3. The apparatus of claim 2, further comprising an interface mechanism configured to enable an operator to communicate with the control module.

4. The apparatus of claim 1, wherein the plurality of form altering modules comprises at least one heating module configured to melt the recyclable material into a condensed form.

5. The apparatus of claim 1, wherein the plurality of form altering modules comprises a mechanism selected from the group consisting of a shredder, burner, crusher, compactor, rotating hammer, weight, cutter, laser, roller, mechanism to produce a sonic blast, and hydraulic powered plate compression mechanism.

6. The apparatus of claim 1, further comprising a communication module configured to connect to a network to enable remote communication to diagnose a malfunction.

7. The apparatus of claim 1, further comprising a display connected to the enclosure, the display configured to display communication information to a user.

8. The apparatus of claim 1, further comprising at least one cleaning module disposed within the enclosure, the at least one cleaning module configured to remove debris from a recyclable material.

9. The apparatus of claim 1, further comprising at least one cleaning module disposed within the enclosure, the at least one cleaning module configured to remove debris from internal components disposed within the enclosure.

10. The apparatus of claim 8, wherein the at least one cleaning module is further configured to blow air.

11. The apparatus of claim 1, further comprising a safety module configured to guard internal components disposed within the enclosure from operator interference.

12. The apparatus of claim 11, wherein the safety module utilizes a security code to limit access to authorized users.

13. The apparatus of claim 1, further comprising a turntable disposed within the enclosure, the turntable configured to retain and position the plurality of receptacles.

14. The apparatus of claim 1, further comprising a turntable disposed within the enclosure, the turntable comprising at least one chute and a shredder assembly.

15. The apparatus of claim 1, wherein the selection module automatically selects a recyclable material to be directed by the director module to one of the plurality of receptacles.

16. The apparatus of claim 15, wherein the selection module further comprises at least one sensor configured to identify a recyclable material.

17. The apparatus of claim 16, wherein the at least one sensor comprises an ultra sonic sensor.

18. The apparatus of claim 1, further comprising at least one sensor configured to monitor the condition of the recyclable material and surrounding environment.

19. A system for condensing, separating and storing recyclable materials, the system comprising:
   an appliance configured to store recyclable materials, the appliance comprising,
      at least one first opening in an enclosure, the at least one first opening configured to receive an item made from a recyclable material;
      a selection module configured to select a type of recyclable material;
      a director module configured to be responsive to a selection made with the selection module to automatically direct a recyclable material to one of the plurality of receptacles according to the type of material selected with the selection module; and
      a second opening formed in the enclosure, the second opening configured to receive a modular form altering device; and
   a modular form altering device for altering the form of an item made from a recyclable material in response to a selection made with a selection module to prepare the recyclable material for storage, wherein the modular form altering device is easily removed and coupled to the appliance.

20. The system of claim 19, wherein the modular form altering device comprises at least one heating module configured to melt the recyclable material into a condensed form.

21. The system of claim 19, wherein the modular form altering device comprises a mechanism selected from the group consisting of a shredder, burner, crusher, compactor, rotating hammer, weight, cutter, laser, roller, mechanism to produce a sonic blast, and hydraulic powered plate compression mechanism.

22. The system of claim 19, further comprising a plurality of receptacles configured to be connected with the at least one first opening and configured to receive a selected type of recyclable material for storage.

23. The system of claim 19, further comprising a control module configured to control internal processes of the appliance.

24. The system of claim 23, further comprising an interface mechanism configured to enable an operator to communicate with the control module.

25. The system of claim 19, further comprising a safety module configured to guard internal components disposed within the enclosure from operator interference.

26. The system of claim 19, further comprising at least one sensor configured to monitor the condition of the recyclable material and surrounding environment.

27. A method for condensing, separating and storing recyclable materials, the method comprising:
   providing an appliance configured to store recyclable materials, the appliance comprising,
      at least one opening in an enclosure, the at least one opening configured to receive an item made from a recyclable material;
      a selection module configured to select a type of recyclable material;
      a plurality of form altering modules configured to alter the form of an item made from a recyclable material in response to a selection made with the selection module to prepare the recyclable material for storage;
      a plurality of receptacles connected with the at least one opening and configured to receive a selected type of recyclable material for storage; and
      a director module configured to be responsive to a selection made with the selection module to automatically direct a recyclable material to one of the plurality of receptacles according to the type of material selected with the selection module;
   inserting a recyclable material into an opening in the enclosure and selecting a type of recyclable material;
   altering the form of the recyclable material for compact storage; and
   directing the recyclable material to a receptacle according to the type of material selected with the selection module.

28. The method of claim 27, further comprising melting the recyclable material into a condensed form.

29. The method of claim 27, further comprising cleaning the recyclable material in preparation for storage.

30. The method of claim 27, further comprising monitoring the condition of the recyclable material and surrounding environment.

31. The method of claim 27, further comprising interchanging a modular from altering device.

* * * * *